(12) United States Patent
Brown et al.

(10) Patent No.: US 7,228,501 B2
(45) Date of Patent: Jun. 5, 2007

(54) METHOD FOR SELECTING A FONT

(75) Inventors: David C. Brown, Redmond, WA (US); Worachai Chaoweeraprasit, Redmond, WA (US); Tarek Mahmoud Sayed, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 10/286,045

(22) Filed: Nov. 1, 2002

(65) Prior Publication Data
US 2004/0088657 A1 May 6, 2004

(51) Int. Cl.
*G06F 15/00* (2006.01)

(52) U.S. Cl. ...................................................... 715/542

(58) Field of Classification Search ................ 715/542, 715/536, 513, 500, 501.1; 345/471, 472; 358/1.11
See application file for complete search history.

(56) References Cited

U.S. PATENT DOCUMENTS

| | | | | |
|---|---|---|---|---|
| 5,412,771 A * | 5/1995 | Fenwick | ................... | 345/468 |
| 5,526,477 A * | 6/1996 | McConnell et al. | ........ | 345/467 |
| 5,689,585 A * | 11/1997 | Bloomberg et al. | ......... | 382/229 |
| 5,698,620 A * | 12/1997 | Wideman et al. | ........... | 524/270 |
| 5,781,714 A * | 7/1998 | Collins et al. | ............... | 345/471 |
| 5,999,706 A * | 12/1999 | Chrosny | ..................... | 358/1.11 |
| 6,073,147 A * | 6/2000 | Chan et al. | .................. | 715/542 |
| 6,204,782 B1 * | 3/2001 | Gonzalez et al. | ............. | 341/90 |
| 6,313,735 B1 | 11/2001 | Higuchi | ..................... | 340/7.54 |
| 6,323,864 B1 * | 11/2001 | Kaul et al. | ................... | 345/467 |
| 6,356,268 B1 * | 3/2002 | Beaman et al. | ............. | 345/467 |
| 6,393,416 B1 * | 5/2002 | Atkin et al. | ................... | 707/4 |
| 6,404,435 B1 * | 6/2002 | Miller et al. | ................ | 345/468 |
| 6,426,751 B1 * | 7/2002 | Patel et al. | .................. | 345/468 |
| 6,426,798 B1 * | 7/2002 | Yeung | ........................ | 358/1.13 |
| 6,493,464 B1 * | 12/2002 | Hawkins et al. | ............. | 382/189 |
| 6,614,541 B1 * | 9/2003 | Fritz et al. | .................. | 358/1.11 |
| 6,623,529 B1 * | 9/2003 | Lakritz | ........................ | 715/536 |
| 6,675,357 B1 * | 1/2004 | Carter et al. | ................. | 715/542 |
| 6,691,281 B1 * | 2/2004 | Sorge et al. | ................. | 715/503 |
| 6,714,199 B1 * | 3/2004 | Beaman et al. | ............. | 345/469 |
| 6,718,519 B1 * | 4/2004 | Taieb | .......................... | 715/542 |
| 6,738,518 B1 * | 5/2004 | Minka et al. | ................ | 382/218 |

(Continued)

FOREIGN PATENT DOCUMENTS

EP    1 033 697    9/2000

(Continued)

OTHER PUBLICATIONS

Maeda et al., Viewing Multilingual Documents on Your Local Web Browser, ACM Apr. 1998, pp. 64-65.*

(Continued)

*Primary Examiner*—Cong-Lac Huynh
(74) *Attorney, Agent, or Firm*—Merchant & Gould

(57) ABSTRACT

The invention is generally directed to a method for selecting a font that uses a mark-up language document to group together multiple pre-existing fonts into a single font family or "virtual font." The mark-up language document includes rules regarding the conditions under which individual fonts within the family are to be used. This permits, for example, a font developer to create, in an efficient manner, an international font using several preexisting fonts.

21 Claims, 3 Drawing Sheets

U.S. PATENT DOCUMENTS

| | | | | |
|---|---|---|---|---|
| 6,760,887 | B1* | 7/2004 | Taieb | 715/542 |
| 6,771,267 | B1* | 8/2004 | Muller | 345/467 |
| 6,813,747 | B1* | 11/2004 | Taieb | 715/542 |
| 6,826,728 | B1* | 11/2004 | Horiyama | 715/542 |
| 6,919,966 | B2* | 7/2005 | Nguyen et al. | 358/1.13 |
| 2002/0016836 | A1* | 2/2002 | Suzuki et al. | 709/223 |
| 2002/0036788 | A1* | 3/2002 | Hino | 358/1.11 |
| 2002/0048032 | A1* | 4/2002 | Ichikawa et al. | 358/1.11 |
| 2002/0091737 | A1* | 7/2002 | Markel | 707/513 |
| 2002/0146181 | A1* | 10/2002 | Azam et al. | 382/309 |
| 2002/0161673 | A1* | 10/2002 | Lee et al. | 705/27 |
| 2002/0178007 | A1* | 11/2002 | Slotznick et al. | 704/270.1 |
| 2003/0002056 | A1* | 1/2003 | Yamaguchi et al. | 358/1.2 |
| 2003/0023590 | A1* | 1/2003 | Atkin | 707/6 |
| 2003/0028561 | A1* | 2/2003 | Gounares et al. | 707/513 |
| 2003/0033334 | A1* | 2/2003 | Banerjee et al. | 707/542 |
| 2003/0093326 | A1* | 5/2003 | Poon et al. | 705/26 |
| 2003/0095135 | A1* | 5/2003 | Kaasila et al. | 345/613 |
| 2003/0126554 | A1* | 7/2003 | Behzadi et al. | 715/501.1 |
| 2003/0126557 | A1* | 7/2003 | Yardumian et al. | 715/513 |
| 2003/0140311 | A1* | 7/2003 | Lemon et al. | 715/513 |
| 2003/0158791 | A1* | 8/2003 | Gilberto et al. | 705/27 |
| 2003/0193502 | A1* | 10/2003 | Patel et al. | 345/440 |
| 2003/0237048 | A1* | 12/2003 | Jones et al. | 715/513 |
| 2004/0003388 | A1* | 1/2004 | Jacquemot et al. | 717/174 |
| 2004/0056894 | A1* | 3/2004 | Zaika et al. | 345/762 |
| 2004/0088657 | A1* | 5/2004 | Brown et al. | 715/513 |
| 2004/0114042 | A1* | 6/2004 | Paolini et al. | 348/207.99 |
| 2004/0128276 | A1* | 7/2004 | Scanlon et al. | 707/1 |
| 2004/0205042 | A1* | 10/2004 | Ritter et al. | 707/2 |
| 2004/0205561 | A1* | 10/2004 | Gibbs et al. | 715/513 |
| 2005/0210379 | A1* | 9/2005 | Weathersby et al. | 715/513 |
| 2005/0213152 | A1* | 9/2005 | Suzuki et al. | 358/1.15 |
| 2005/0228796 | A1* | 10/2005 | Jung | 707/10 |
| 2006/0173951 | A1* | 8/2006 | Arteaga et al. | 709/203 |
| 2006/0193321 | A1* | 8/2006 | Shell et al. | 370/389 |

FOREIGN PATENT DOCUMENTS

| | | |
|---|---|---|
| WO | WO 94/23379 A | 10/1994 |

OTHER PUBLICATIONS

Sakaguchi et al., A Browsing Tool for Multi-lingual Documents for Users without Multi-lingual Fonts, ACM 1996, pp. 63-71.*

Maeda et al., Viewing Multilingual Documents on Your Local Web Browser, ACM Apr. 1998, pp. 64-65.*

Brun et al., Document Structure and Multilingual Authoring, ACM 2000, pp. 24-31.*

Canfora et al., A Visual Approach fo Define XML to FO Transformations, ACM 2002, pp. 563-570.*

Bert Bos, Håkon Wium Lie, Chris Lilley, Ian Jacobs: "Cascading Style Sheets, Level 2, CSS2 Specification" 'Online! May 1998, W3C Recommendation (Mit, Inria, Keio)., XP002331246 Retrieved from the Internet: URL:http://www.w3.org/TR/REC-CSS2/>.

*Specifying virtual fonts in XML for handling variant characters*; www.lists.xml.org/archives/xml-dev/199811/msg0051.html; XML.org; pp. 1-2 (2001).

*Internationalize your software, Part 3: Learn how to develop software for the global marketplace*; www.javaworld.com/javaworld/jw-o2-1999/jw-02-internationalize-p3.html; Javaworld.com; pp. 1-12 (2002).

Celik et al.; W3C; *CSS3 module: Fonts*; www.w3.org/TR/2001/WD-css3-fonts-20010731; pp. 1-30 (2001).

Syropoulos; *Typesetting Native American Languages*; The Journal Of Electronic Publishing, University of Michigan Press, pp. 1-8; 8:1:2002.

Bishop et al.; *Windows™ 2000 Indian Language Developers Conference*; Microsoft Corporation; pp. 1-91; (2000).

Hoenig; *TEX Unbound:Latex & Tex Strategies for Fonts, Grahphics, & More*: Oxford University Press; pp. 166-315; (1998).

* cited by examiner

METHOD FOR SELECTING A FONT

TECHNICAL FIELD OF THE INVENTION

The invention relates generally to font selection techniques and, more specifically, to font selection techniques that use mark-up language documents to define one or more selection criteria.

BACKGROUND

A font is a set of displayable images, or "glyphs," each of which depicts a letter, character or symbol. Each glyph can be thought of as the computer-age equivalent of a block of type used in a printing press. Developing a font is a skilled, labor intensive task. Typographers spend many hours crafting each glyph in a font, and consider not only the shape of the glyph itself, but also how the glyph will look in any likely combination with other glyphs. While developing a font for a single language is challenging, developing a single font that is supposed to cover multiple languages is even more difficult. For example, a font for plain English (US or UK) may need less than a hundred glyphs, but a font to support all scripts written with a Latin based alphabet requires thousands of glyphs. Similarly, basic typesetting of Arabic can be achieved with around a hundred glyphs, but setting all languages that are based on the Arabic writing system requires thousands of glyphs. Many other writing systems, such as Cyrillic, Greek, Hebrew and Thai, have also been used as the basis of extended glyph repertoires and thus provide a similar challenge in scale. Finally, although limited in variations, East Asian scripts, such as Chinese, Japanese and Korean, contain tens of thousands of glyphs. Thus, a truly international font requires of the order of 50,000 to 100,000 glyphs.

To conserve memory, many international fonts cut corners by, for example, using a single glyph for multiple written languages, even if the glyph is only appropriate for one language. For example, some East Asian ideographic characters are written differently by Chinese speakers than by Japanese speakers. However, the Unicode system, which forms the basis for many international fonts, often uses only one code for such characters. Thus, a typographer who is developing an international font may be forced to choose between constructing the Chinese version of a character or constructing the Japanese version of the character. Furthermore, there are often stylistic differences between Japanese and Chinese ideographs that are not accounted for by Unicode. This presents a similar problem for a typographer because even though the Chinese and Japanese versions of a particular ideograph might be the same in terms of number and arrangement of strokes, it is not necessarily appropriate to present a glyph from a Chinese font in a Japanese document, or vice versa.

A font developer might choose to build an international font by collecting glyphs together from several single writing system fonts, taking care to match the purpose of the international font and to keep the glyphs balanced in weight and size. When matching fonts for this purpose, a font developer may find that some groups of writing systems have more similarity than differences. For example, Latin, Greek and Cyrillic scripts share many features, such as upper and lower case letters, and the use of serifed and sans serif styles. In contrast, writing systems such as Arabic also have a huge variety of typographic styles, although none correspond so directly to other scripts as, for example, Latin and Cyrillic do. Thus when creating a range of international fonts for a variety of purposes, font developers may mix and match existing fonts in different ways, and even incorporate a font for a single writing system into several different international fonts. For example, the 'Arial' and 'Times New Roman' fonts used in MICROSOFT® products contain different Latin glyph sets, but use the same Arabic glyph set.

To summarize, international font developers face a variety of problems when using current font development techniques. One problem is that time is wasted constructing, testing maintaining the same glyphs into multiple fonts. Another problem is that, to match correctly in size, some glyph sets need resizing, which is usually an expensive process. Yet another problem is that glyph counts frequently exceed the maximum allowed by current font technologies (65536 for TrueType/OpenType). Finally, as the previous discussion indicates, representing the same glyphs in multiple fonts wastes memory.

Wasted memory is of particular concern in the context of printer fonts. Most of today's printers include built-in fonts. Thus, when using a printer font, a computer program need only send character codes to the printer, rather than sending entire glyphs. When using a font not included with the printer, however, the computer program also needs to download the font to the printer. This increases the size of temporary files created during the print process, the time needed to print the document at the client workstation, the time needed to transmit the document to the printer at the print server. It also consumes precious memory inside the printer.

SUMMARY

In accordance with the foregoing, a method for selecting a font is provided herein. According to various embodiments of the invention, a mark-up language document includes rules for determining which of a plurality of fonts is to be used under a given set of circumstances. The mark-up language document may also define whether or how glyphs obtained from the selected font are to be enlarged or reduced. The determination of which font to be used is influenced by such factors as language or locality information associated with a document in which the font is to be used.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

The invention is generally directed to a method for selecting a font that uses a mark-up language document to group together multiple pre-existing fonts into a single font family or "virtual font." The mark-up language document includes rules regarding the conditions under which individual fonts within the family are to be used. This permits, for example, a font developer to create, in an efficient manner, an international font using several preexisting fonts.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multiprocessor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
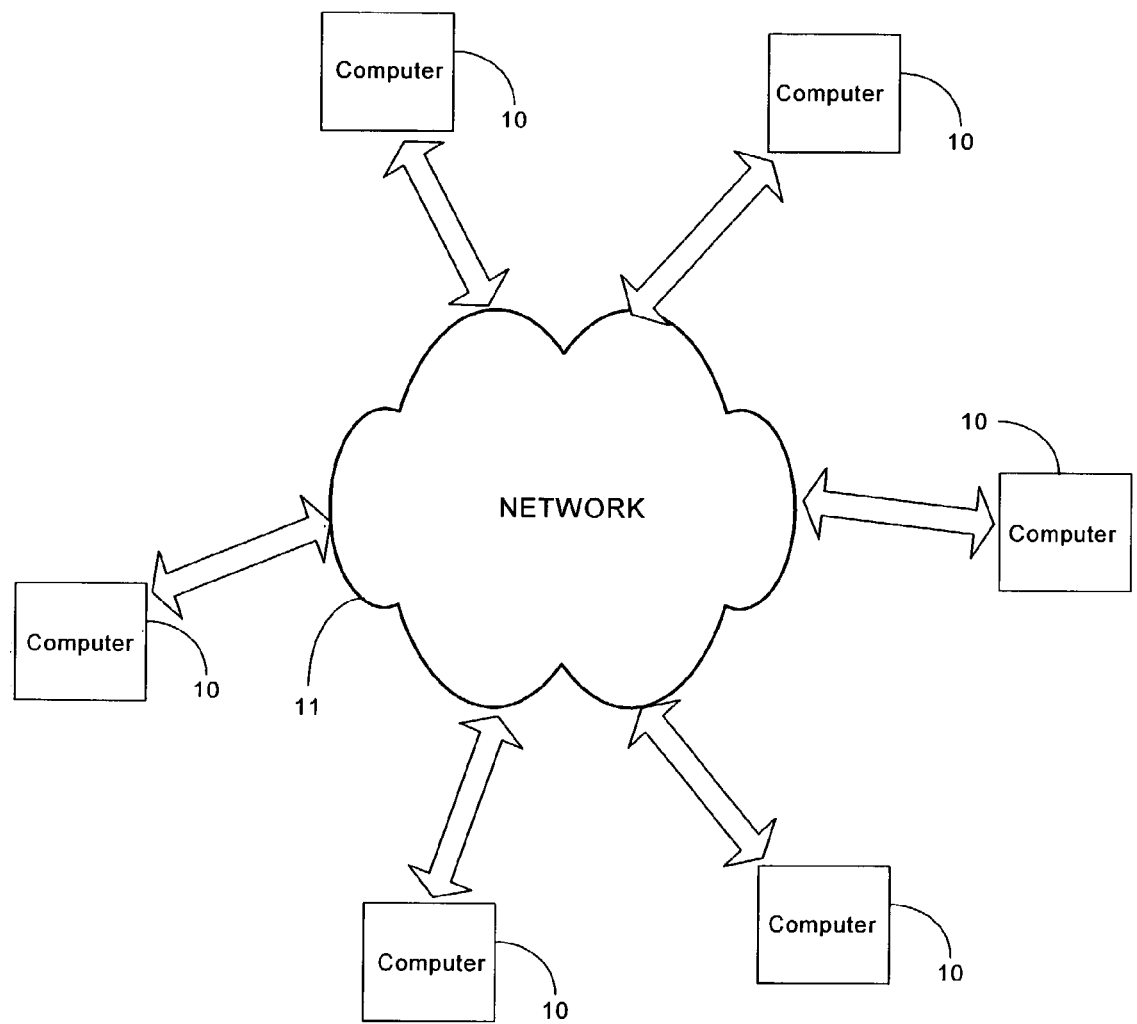
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even though specific examples contained herein don't refer to all of these types of computers.

Figure 2:
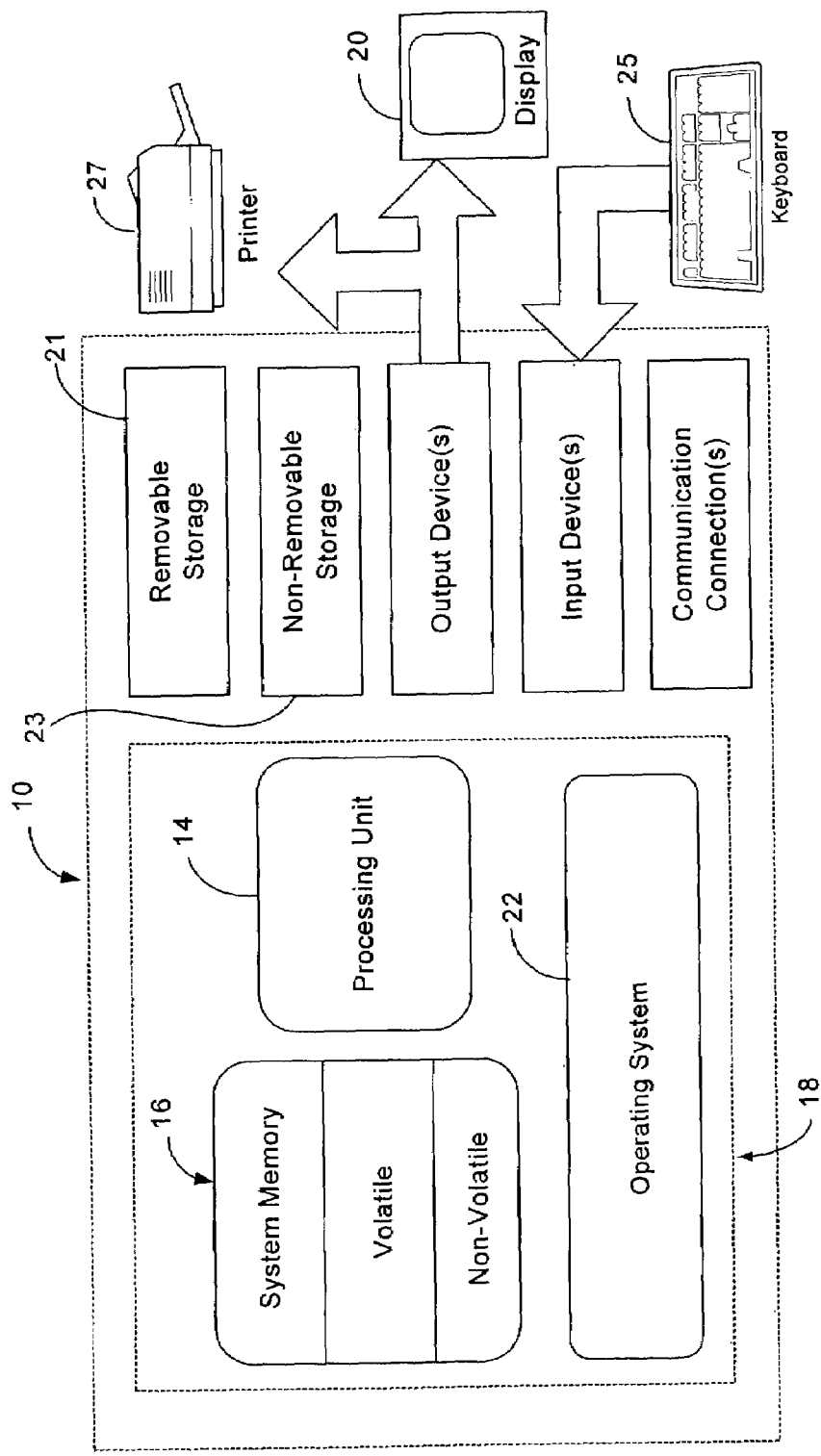
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. At least some of these instructions are generated by an operating system 22. The operating system 22 may include several user mode and kernel mode programs. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (such as a removable storage 21 and/or a non-removable storage 23) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard 25, mouse, pen, voice input device, touch input device, etc. Output devices such as a display 20, speakers, a printer 27, etc. may also be included. All these devices are well known in the art and need not be discussed at length here.

An example of how multiple fonts may be organized into a single virtual font according to an embodiment of the invention will now be described with reference to FIG. 3. In this example, a computer automated design (CAD) program 26 executes as an application program on the computer 10 (from FIG. 2), while a glyph generation module 28 executes as part of the operating system 22. During execution, the CAD program 26 performs operations on a CAD file 27, which contains a CAD document along with property information regarding the document. The operating system 22 obtains data regarding the language in which a user of the computer 10 is operating and provides this information to the glyph generation module 28. The operating system 22 may obtain the user language information from a variety of sources, but in this example, the operating system 22 is assumed to have determined the user's language based on the property information contained in the CAD file 27. In other embodiments, the operating system 22 may obtain the information from the locality setting of the keyboard 25 (FIG. 2). Furthermore, when the user types, the operating system 22 receives input from the keyboard 25 indicating the Unicode value for each keystroke.

The glyph generation module 28 generates the glyphs that are to be shown on the display 20. The glyph generation module 28 obtains these glyphs from one or more fonts files. The font files, such as the font files 32, 34, 36 and 38 shown in FIG. 3, are stored in a memory of the computer 10 (FIG. 2) and/or in a memory of the printer 27. To determine the font file or files from which to obtain the glyphs, the glyph generation module 28 parses the virtual font file 30. Using the data it received from the operating system 22 (regarding the language that is to be displayed), the glyph generation module 28 selects the appropriate font file from the virtual font file 30. The glyph generation module 28 then obtains the appropriate glyphs from the selected font file and displays them on the display 20.

When a document is to be printed on the printer 27, the glyph generation module 28 behaves in a somewhat different manner. In the case of printing, the glyph generation module 28 selects the font to be used, but does not actually generated the printer glyphs. Instead, the glyph generation module 28 sends the name of the font that is to be used to the printer 27, along with the Unicode values of the glyphs that are to be printed and any metrics, such as scaling data, that are needed. If the printer 27 has the font file of the selected font stored in its memory, then the printer 27 prints the glyphs. If, on the other had, the printer 27 does not have the correct font, then the printer 27 indicates this fact to the glyph generation module 28. The glyph generation module 28 then chooses another font from the virtual font file 30, and sends the name of the newly selected font to the printer 27 along with the Unicode values of the glyphs to be printed and any required scaling data. The glyph generation module 28 may repeat this procedure until it finds a font that the printer 27 possesses. If the glyph generation module 28 does not find a font that the printer 21 possesses, then the glyph generation module 28 chooses a fallback font, which is specified in the virtual font file 30 and stored in the memory of the computer 10. The glyph generation module 28 then retrieves the appropriate glyphs of the fallback font and sends them to the printer 27. In various embodiments of the invention, the fallback font has glyphs that are sized appropriately for being printed on the printer 27.

Figure 3:
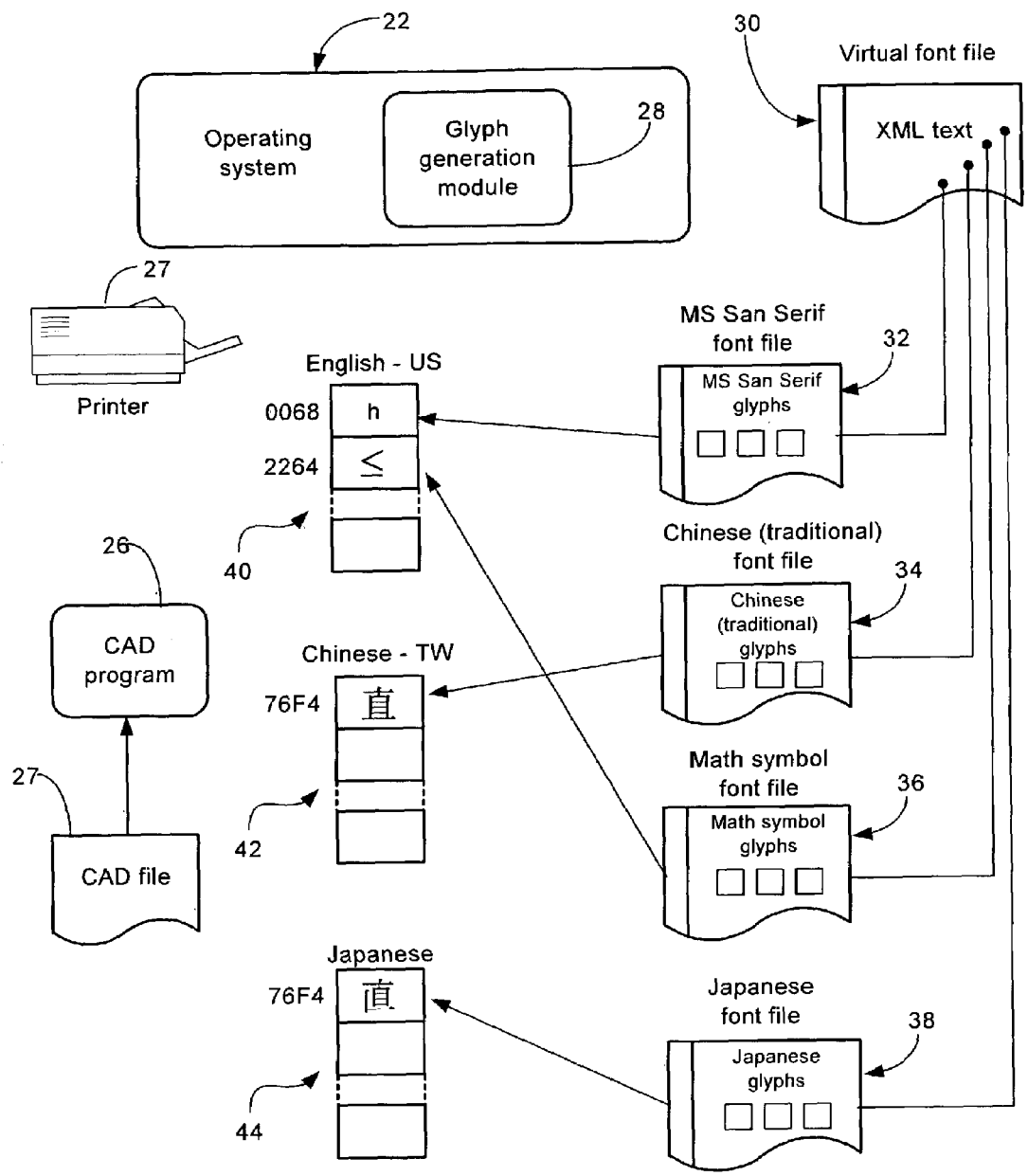
FIG. 3 illustrates an embodiment of the invention.

Continuing with the description of FIG. 3, a Microsoft San Serif font file 32, a Chinese (traditional) #2 font file 34, a Math Symbol #5 font file 36 and a Japanese #10 font file 38 are stored in the memory 16, the removable storage 21, and/or the non-removable storage 23 (FIG. 2). The virtual font file 30 in this example has been created for the purpose of displaying Latin characters, traditional Chinese characters, Japanese characters and math symbols on the user interface of the CAD program 26. Accordingly, the author of the CAD program 26 has chosen the four fonts—Microsoft San Serif, Chinese (traditional) #2, Math Symbol #5 and Japanese #10—as the most appropriate fonts to be used for this purpose. Each of the font files 32, 34, 46 and 38 contains a set of glyphs. The virtual font file 30 contains mark-up language text having instructions that tell the glyph generation module 28 how, when and under what conditions each of the four fonts is to be displayed in the CAD program 26. In this example, the virtual font file 30 is assumed to contain the following Extensible Mark-up Language (XML) text:

```
<Font Family
    <Name xml:lang = "en-US"> name = "MS International"</Name>
    <Name xml:lang = "zh-TW"> 國際 </Name>
    <Name xml:lang = "ja"> インターナショナル </Name>
<Range UnicodeRange = "2200–22FF" TargetFontFamily = "Math Symbol #5"/>
    <Range xml:lang = "zh-TW" TargetFontFamily = "Chinese (traditional) #2"/>
    <Range xml:lang = "ja" TargetFontFamily = "Japanese #10"/>
    <Range xml:lang = "en-US" UnicodeRange = "4E00–9FAF"
    TargetFontFamily = "Chinese (traditional) #2" size = "1.1"/>
    <Range xml:lang = "en-US" family = "Microsoft San Serif"/>
    <Range TargetFontFamily = "Arial"/>
</Font Family>
```

As the beginning and ending tags of the block of XML text indicate, the virtual font file 30, in effect, describes a family of fonts that include the Microsoft San Serif, Chinese (traditional) #2, Math Symbol #5 and Japanese #10 fonts. The first three lines of XML text—with the "Name" tags— include conditional instructions regarding what name will be given to the font family represented by the virtual font file 30. For example, the line <Name xml:lang="en-US"> name="MS International"</Name> indicates that if the user's language is English-US ("en-US"), then the glyph generation module 28 should name the font family "MS international." The next line, <Name xml:lang="zh-TW"> 國際 </Name>, indicates that if the user is operating in Chinese-Taiwan, then the name given to the virtual font family should be "國際" (which approximates the meaning of "international" in Chinese). The following line, <Name xml:lang="ja">インターナショナル</Name>, indicates that if the user is operating in Japanese, then the name given to the virtual font family should be "インターナショナル" (which is the Japanese pronunciation of the English word "international"). The name of the font family does not necessarily appear to the user of the CAD program 26, but may appear if, for example, the user purposefully selects a "settings" menu to see what font is being used.

The next line, which reads <Range UnicodeRange="2200-22FF" TargetFontFamily="Math Symbol #5"/>, indicates to the glyph generation module 28 that if a character is received from the keyboard having a Unicode that falls in the range 2200-22FF, then the font to be used to render the glyph is the Math Symbol #5 font. The next three lines determine the font to be used based the user's language. For example, if the user's written language is Chinese-Taiwan, then the font to be used is the Chinese (traditional) #2 font. If, on the other hand, the user's written language is Japanese, then the font to be used is the Japanese #10 font. Referring again to the block of XML text shown above and to FIG. 3, the next line, which reads <Range xml:lang="en-US" UnicodeRange="4E00-9FAF" TargetFontFamily="Chinese (traditional) #2" size="1.1"/>, sets two conditions: one based on the user's language and one based on the Unicode value of keystrokes. In this case, if the user's language is English-US and the Unicode value generated by a keystroke is between 4E00 and 9FAF (which represents the UnicodeRange for CJK Unified—having most of the Chinese, Japanese and Korean ideographic characters), then the font to be used by the glyph generation module 28 is the Chinese (traditional) #2 font. Furthermore, the size of the glyphs are to be scaled up to 110% of their original size. In this example, the developer of the font family "MS International" determined that, for showing Chinese, Japanese or Korean ideographic glyphs alongside Microsoft San Serif roman characters, the Chinese (traditional) #2 font, with the glyphs scaled to 110% of their original size, creates the most optimal visual effect.

The line reads <Range xml:lang="en-US" family="Microsoft San Serif"/>, which indicates that if the user is operating in English-US, the Microsoft San Serif font is to be used. This line of instructions acts as a default in the event that the appropriate language to be used is English—US, but that the conditions specified in the previous lines are not satisfied. Finally, the last line before the </FontFamily> tag is <Range TargetFontFamily="Arial"/>, which specifies a final default font to be used in the event that none of the explicit conditions of the previous lines apply.

Referring again to FIG. 3, a series of scenarios in which the glyph generation module 28 generates glyphs according to an embodiment of the invention will now be described. In the first scenario, the operating system 22 detects that the keyboard 25 has generated a Unicode value of 0068, and passes this value to the glyph generation module 28. The operating system 22 also informs the glyph generation module 28 that the CAD file 27 contains a document that is intended to be displayed in English-US. The glyph generation module 28 creates a list 40 to act as a cache for the glyphs that are to be displayed. The glyph generation module 28 refers to the virtual font file 30 to determine how to handle the Unicode value of 0068. Based on the line "<Range XML:Lang="en-US" family="Microsoft San Serif"/>" the glyph generation module 28 determines that the proper font to use is the Microsoft San Serif font, which is contained in the Microsoft San Serif font file 32. The glyph generation module 28 references the font file 32 to locate the glyph corresponding to the Unicode value of 0068. In this case, the glyph is -h- The glyph generation module 28 then copies the glyph -h- into the list 40, and associates the glyph with the value 0068. The glyph generation module 28 then passes the glyph to the operating system 22 to be displayed.

In the second scenario, the operating system 22 detects that the keyboard 25 has generated a Unicode value of 2264, and passes this value to the glyph generation module 28. The operating system 22 also informs the glyph generation module 28 that the CAD file 27 contains a document that is intended to be displayed in English-US. The glyph generation module 28 refers to the virtual font file 30 to determine how to handle the Unicode value of 2264. Based on the line "<Range UnicodeRange="2200-22FF" family="Math Symbol #5"/>" the glyph generation module 28 determines that the proper font to use is the Math Symbol #5 font, which is contained in the Math Symbol #5 font file 36. The glyph generation module 28 references the font file 36 to locate the glyph corresponding to the Unicode value of 2264. In this case, the glyph is -≦- The glyph generation module 28 then copies the glyph -≦- into the list 40, and associates the glyph with the value 2264. The glyph generation module 28 then passes the glyph to the operating system 22 to be displayed.

In the third scenario, the operating system 22 detects that the keyboard 25 has generated a Unicode value of 76F4, and passes this value to the glyph generation module 28. The operating system 22 also informs the glyph generation module 28 that the CAD file 27 contains a document that is intended to be displayed in Chinese-Taiwan. The glyph generation module 28 refers to the virtual font file 30 to determine how to handle the Unicode value of 76F4. Based on the line "<Range XML:Lang="ch-TW" family="Chinese (traditional) #2"/>" the glyph generation module 28 determines that the proper font to use is the Chinese (traditional) #2 font, which is contained in the Chinese (traditional) #2 font file 34. The glyph generation module 28 references the font file 34 to locate the glyph corresponding to the Unicode value of 76F4. In this case, the glyph is 直. This particular glyph represents the ideograph for the concept of "straight," as in "direct" or "honest." The glyph generation module 28 then copies the glyph into the list 42, and associates the glyph with the value 76F4. The glyph generation module 28 then passes the glyph to the operating system 22 to be displayed.

In the fourth scenario, the operating system 22 detects that the keyboard 25 has generated a Unicode value of 76F4, and passes this value to the glyph generation module 28. The operating system 22 also informs the glyph generation module 28 that the CAD file 27 contains a document that is intended to be displayed in Japanese. The glyph generation module 28 refers to the virtual font file 30 to determine how to handle the Unicode value of 76F4. Based on the line "<Range XML:Lang="jp" family="Japanese #10"/>" the glyph generation module 28 determines that the proper font to use is the Japanese #10 font, which is contained in the Japanese #10 font file 38. The glyph generation module 28 references the font file 34 to locate the glyph corresponding to the Unicode value of 直76F4. In this case, the glyph is. This glyph also represents the ideograph for the concept of "straight," but is rendered in its Japanese variation. The glyph generation module 28 then copies the glyph into the list 44, and associates the glyph with the value 76F4. The glyph generation module 28 then passes the glyph to the operating system 22 to be displayed.

It can thus be seen that a new and useful method for selecting a font has been provided. In view of the many possible embodiments to which the principles of this invention may be applied, it should be recognized that the embodiments described herein with respect to the drawing figure is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for selecting a font, the method comprising:
    receiving a code indicating what type of character is required by a computer program;
    referencing an extensible mark-up language document, wherein the extensible mark-up language document is linked to a plurality of font files; and
    determining, based on the contents of the extensible mark-up language document, which of a plurality of fonts is needed by the computer program to display a character of the type required by the computer program, wherein if the required font is not available, using a fallback font specified by the extensible mark-up language document.

2. A computer-readable medium having stored thereon computer-executable instructions for performing the method of claim 1.

3. The method of claim 1, further comprising:
    retrieving a glyph from the font that is determined to be needed, wherein the glyph is displayable to represent the character.

4. The method of claim 1, further comprising:
    retrieving a glyph from the font that is determined to be needed; and
    providing the glyph to the computer program.

5. The method of claim 1, wherein the computer program executes on a computer, the method further comprising:
    determining the language of a document in which the selected font is to be displayed,
    wherein the step of determining which of a plurality of fonts is needed by the computer program comprises determining, based on the determined language of the document, which of the plurality of fonts is needed by the computer.

6. The method of claim 1, further comprising sending information regarding the determined font to a printer.

7. A method for determining which of a plurality of fonts to use in a computer program, the method comprising:
    referencing an extensible mark-up language document that defines a logical condition for using at least one font of the plurality of fonts;
    determining if the logical condition is satisfied; and if the logical condition is satisfied, retrieving a glyph of the at least one fonts wherein if the logical condition is not satisfied, using a default font specified by the extensible mark-up language document.

8. A computer-readable medium having stored thereon computer-executable instructions for performing the method of claim 7.

9. The method of claim 7,
wherein the program executes on a computer,
wherein the logical condition relates to a language in which a document is written, and
wherein the glyph retrieved is from a font that is appropriate to the language.

10. The method of claim 7, wherein the program interacts with a user who is using a computer, wherein the extensible mark-up language document defines a font that is to be used if it is determined that the user is interacting with the computer in a particular written language, the method further comprising:
determining that the user is using the particular language; and
in response to determining that the user is using the particular language, retrieving a glyph of the font.

11. The method of claim 7, wherein the computer program interacts with a user who is using a computer, the method further comprising:
determining that a keyboard of the computer is set to a particular language;
determining, based on the extensible mark-up language document, that the at least one font is to be used for the particular language; and
providing the glyph of the at least one font to the computer program.

12. A method for obtaining glyphs from a plurality of fonts, the method comprising:
referencing an extensible mark-up language document that defines a logical condition for using a first font of the plurality of fonts and a logical condition for using a second font of the plurality of fonts;
determining if the logical condition for using the first font of the plurality of fonts is satisfied;
if the logical condition for using the first font of the plurality of fonts is satisfied, retrieving one or more glyphs of the first font;
determining if the logical condition for using the second font of the plurality of fonts is satisfied; and
if the logical condition for using the second font of the plurality of fonts is satisfied, retrieving one or more glyphs of the second font, wherein if the logical condition for using the first font and the logical condition for using the second font are not satisfied, using a default font specified by the extensible mark-up language document.

13. A computer-readable medium having stored thereon computer-executable instructions for performing the method of claim 12.

14. The method of claim 12, further comprising:
resizing the one or more glyphs of at least one of the first and second fonts based on scaling information contained in the mark-up language document.

15. The method of claim 12,
wherein the first font comprises glyphs of a first written language and the second font comprises glyphs of a second written language, and
wherein the glyphs of the first font and second font are adapted to allow the first written language and the second written language to be displayed alongside one another.

16. A computer-readable storage medium having stored thereon extensible mark-up language text, the extensible mark-up language text comprising:
a reference to a first font within the extensible mark-up language text;
data representing a condition under which the first font is to be used, the data being retrieved from a first font file by the extensible mark-up language text;
a scaling factor that indicates how the first font is to be resized if the condition under which the first font is to be used is satisfied;
a reference to a second font within the extensible mark-up language text; and
data representing a condition under which the second font is to be used, the data being retrieved from a second font file by the mark-up language text.

17. The computer-readable medium of claim 16,
wherein the condition under which the first font is to be used is based, at least in part, on the language that a user of a computer prefers.

18. The computer-readable medium of claim 16,
wherein the condition under which the first font is to be used is based, at least in part, on the language for which a keyboard of a computer is set.

19. The computer-readable medium of claim 16,
wherein the condition for the use of the first font relates to the range in which the Unicode value of a character typed into a computer falls.

20. The computer-readable medium of claim 16,
wherein the condition for the use of the first font relates to the range in which the Unicode value of a character typed into a computer falls and the language that a user of the computer prefers.

21. The computer-readable medium of claim 16,
wherein the condition under which the first font is to be used is based, at least in part, on the language for which a document is set, the document being the medium in which either the first or second font is to be used.

* * * * *